US008358820B2

(12) United States Patent
Merlet et al.

(10) Patent No.: US 8,358,820 B2
(45) Date of Patent: Jan. 22, 2013

(54) MODIFYING SOFTWARE TO COPE WITH CHANGING MACHINERY

(75) Inventors: Nicolas J. Merlet, Jerusalem (IL); Philippe Nathan Bamberger, Jerusalem (IL)

(73) Assignee: Siemens Computer Aided Diagnosis Ltd., Jerusalem (IL)

( * ) Notice: Subject to any disclaimer, the term of this patent is extended or adjusted under 35 U.S.C. 154(b) by 1157 days.

(21) Appl. No.: 12/045,264

(22) Filed: Mar. 10, 2008

(65) Prior Publication Data

US 2009/0010486 A1 Jan. 8, 2009

Related U.S. Application Data

(60) Provisional application No. 60/906,237, filed on Mar. 12, 2007.

(51) Int. Cl.
*G06K 9/00* (2006.01)
(52) U.S. Cl. ....................................................... 382/128
(58) Field of Classification Search ........... 382/128–132
See application file for complete search history.

(56) References Cited

U.S. PATENT DOCUMENTS

| 5,799,100 | A | 8/1998 | Clarke | |
|---|---|---|---|---|
| 5,872,859 | A | 2/1999 | Gur | |
| 7,072,498 | B1* | 7/2006 | Roehrig et al. | 382/128 |
| 2004/0086158 | A1* | 5/2004 | Leichter et al. | 382/128 |
| 2008/0187194 | A1* | 8/2008 | Zhang et al. | 382/128 |

FOREIGN PATENT DOCUMENTS

| WO | WO 9905641 A1 | 2/1999 |
|---|---|---|
| WO | WO 2004051917 A1 | 6/2004 |

OTHER PUBLICATIONS

Riley et al., 'Mathematical Methods for Physics and Engineering' 2002, Cambridge University Press, Second Edition, p. 300.*
N. Karssemeijer, "Adaptive noise equalization and recognition of microcalcification cluster in mammograms", International Journal of Pattern Recognition and Artificial Intelligence, World Scientific Publishing, Singapore, SI, vol. 7, No. 6, Dec. 1, 1993, pp. 1357-1376, XP 009093530.
Timp, et al, "Interval change analysis to improve computer aided detection in mammography", Medical Image Analysis, Oxford University Press, Oxford, GB, vol. 10, No. 1, Feb. 1, 2006, pp. 82-95, XP 005205983.

* cited by examiner

*Primary Examiner* — Robert Kim
*Assistant Examiner* — Eliza Osenbaugh-Stewart
(74) *Attorney, Agent, or Firm* — Peter Withstandley

(57) ABSTRACT

A method for adapting a detection algorithm developed for usage with data generated by a first system to data generated with a second system, the algorithm for fail safe diagnosis of irregularities including a first procedure of detecting irregularities with minimal type I errors and a second procedure of filtering out type II errors; the data generated including values for selected features characterizing the irregularities; the method including applying an intermediate step of linearly transposing the values of each selected feature generated by the first procedure, prior to applying the second procedure to those values.

3 Claims, 8 Drawing Sheets

MODIFYING SOFTWARE TO COPE WITH CHANGING MACHINERY

CROSS REFERENCE TO RELATED APPLICATION

The present application claims priority rights from U.S. Provisional Application No. 60/906,237, filed Mar. 12, 2007.

FIELD OF THE INVENTION

The present invention is directed to a method of modifying software developed for one computerized system for use with a different system, specifically for modifying image analysis algorithms developed for one system for use on another system.

BACKGROUND

Statistical tests always involve a trade-off between: (a) the acceptable level of 'false positives' in where a non-match is inadvertently declared to be a match, and (b) the acceptable level of 'false negatives' where actual matches are not detected. A threshold value can be varied to make the test more restrictive or more sensitive, with the more restrictive tests increasing the risk of rejecting true positives, and the more sensitive tests increasing the risk of accepting false positives.

Perhaps the most widely discussed false positives in medical screening come from the breast cancer screening procedure mammography since more than 10% of women in the western world contract breast cancer, and the success and ease of treatment is highly dependent on early diagnosis. Mammography is the use of low-dose x-ray radiation to image the tissue inside the breast. The technique is used to screen for and diagnose breast cancer by detecting tumors or other changes in breast tissue and aids in early detection of malignant tumors, which improves chances of successful treatment. It can identify abnormalities before a lump can be felt and provides the only reliable method of locating abnormal growths in the milk ducts. Thus it may facilitate locating suspected tumors, prior to a biopsy or surgery.

In consequence of the dangers of breast cancer and the success of mammography, the guidelines laid by the U.S. Department of Health and Human Services (HHS), the American Cancer Society (ACS), the American Medical Association (AMA) and the American College of Radiology (ACR) recommend that screening mammograms be performed annually for all women over the age of 40 in good health, with annual mammograms being advisable at earlier ages for women with a family history of breast cancer or having had pror breast biopsies.

It is, of course, imperative to prevent missing a malignant tumor. To avoid unnecessary anxiety and to reduce costs of unnecessary biopsies; it is desirable to minimize false positives as well.

In mammography, the breast is compressed between two plates and exposed to X-rays. Two pictures of each breast are generally taken during a screening mammogram, with extra images from different angles being sometimes necessary for women with breast implants. With so many scans requiring analysis, it is essential to automate the analysis as much as possible and to optimize the computer aided examination of the X-Ray images, both by increased accuracy of the analysis and by faster processing times.

The size and shape of the breast is highly variable between women and the thickness of the imaged compressed tissues differs significantly between subjects. The tissue composition of the breast is also highly variable and therefore the average absorption of X-rays by the breast tissue varies significantly between women.

Compared to other anatomical regions, the breast has very low physical contrast because it is composed completely of soft tissues. In general, the breast consists of a background of fat surrounding the slightly denser, glandular structures and pathologic tissues or cysts if they are present. Typical breast calcifications are very small and thin and produce low physical contrast despite calcium being somewhat denser to X-rays than the elements from which soft tissues are constructed.

Mammography systems vary considerably and there is ongoing development work to improve the sensitivity of such equipment. Digital mammography is preferably to conventional film in that better contrast is available. Digital mammogram images are stored as digital pictures which can be transmitted easily for remote consultation.

Mammography is generally performed with a spectrum containing photons within a relatively narrow energy range (19 keV-21 kev) in an attempt to obtain high contrast with minimal dosage. The spectrum is produced using the characteristic radiation from a molybdenum anode x-ray tube and filtered by either a molybdenum or a rhodium filter.

The molybdenum anode, molybdenum filter system is quite good for general mammography in that it provides a spectrum that is very close to the optimum spectrum for smaller and less dense breasts. Many mammography machines give the operator the opportunity of selecting between molybdenum and rhodium filters, the latter being useful when imaging denser breasts.

Some systems have dual track anodes so that either molybdenum or rhodium can be selected as the anode material. Because of its higher atomic number (Z) rhodium produces characteristic x-radiation with higher energies than molybdenum. When the rhodium anode is selected, the beam penetration is increased. Generally, this produces better results when imaging dense breast. Since the physical parameters of X-ray sources used for mammography vary between different systems, a high variability is introduced between mammography images which is an artifact of the imaging parameters and not a result of different physiologies.

In order to assist radiologists in diagnosing breast cancer from mammography images, Computer Aided Detection (CAD) of suspicious findings has been introduced and is used at a growing number of clinical sites.

CAD systems for mammography, and indeed, for determining lung cancer as well, are based essentially on five basic processing steps:

(1) Segmentation of the organ to be analyzed;
(2) Location of tumor candidates;
(3) Extraction of the boundaries of tumor candidates;
(4) Extraction of feature parameters, and
(5) Discrimination between normal and abnormal features using classifiers.

Once a full CAD process has been engineered and trained using a certain set of mammograms, it is desirable that the same performance be obtained for other sets of mammograms. However, there are a great variety of systems in this field. For example, film mammography is still in wide usage, and digitizing a film gives images that look very different from the appearance of images generated by computerized mammography. The various Full field digital mammography (FFDM) systems produce images having different styles.

Similar performance is not obtained where CAD systems are used on digital mammograms of the same breasts if the mammograms are produced using totally different types of equipment. It has been verified, for example, that a CAD algorithm trained on a set of digitized film mammograms delivers poor performance on FFDM produced mammograms, even after these new images are modified to present the same basic characteristics of the digitized films.

Even within the same generic type of mammography equipment, each model has its own technical characteristics relating to among other things resolution, pixel depth (i.e. bits per pixel), dynamic range, and noise. Thus software trained on images obtained using one x-ray imaging system will not generally give good results when used with a different system. Some lesion candidates that should be classified as non relevant may be wrongly diagnosed as being malignant. Malignant lesions may be wrongly diagnosed as being non relevant.

Ideally each system improvement and each new apparatus should be trained using fully analyzed images. It is not always practical to do so however. Sometimes an appropriate image set is simply not available. There is thus a need to adapt software developed for one system to use on another system, and the need is particularly acute in the mammography field. The present invention addresses this need.

SUMMARY OF THE INVENTION

Aspects of the invention are directed to use of the method described herein below for adapting algorithms developed for one system for use on another system, or an updated version of the first system, such as: training imaging systems for identifying irregularities in images. It will be appreciated that changes in hardware used for obtaining images need to be compensated for when using software developed for the original hardware. Specific applications include training medical imaging/diagnostic equipment. Aspects of the invention are particularly useful for training medical imaging equipment to identify malignancies in medical images, such as adapting mammography algorithms for new equipment, for example.

Other applications include training imaging equipment for semiconductor quality control applications and the like, and training military diagnosing equipment selected from the group comprising radar, sonar, and visual imaging systems.

In a first aspect, the present invention is directed to a method for adapting a detection algorithm developed for usage with data generated by a first system to data generated with a second system, the algorithm for fail safe diagnosis of irregularities comprises a first procedure of detecting irregularities with minimal type I errors and a second procedure of filtering out type II errors; the data generated comprising values for selected features characterizing the irregularities; the method comprising applying an intermediate step of linearly transposing the values of each selected feature generated by the first procedure, prior to applying the second procedure to those values.

Optionally, the intermediate step of linear transposing comprises determining a numerical multiplier $a_v$ and an offset $b_v$ for each significant feature v considered in diagnosis.

In one embodiment, numerical multiplier $a_{v1}$ and offset $b_{v1}$ are determined for a significant variable v1 by comparing average results obtained with second system $T_s$ to average results obtained with first system $T_f$ for both positive 'TRUE' identifications T and type II errors 'False Positive' FP for a large data set to generate two equations:

$$T_f = a_{v1} T_s + b_{v1} \quad [1]$$

and $$FP_f = a_{v1} FP_s (\text{result average}) + b_{v1} \quad [2]$$

and solving the equations simultaneously.

In one embodiment, wherein the irregularities are qualitatively classified as True T or False Positive FP, the linear transposing comprising:

for each feature in turn:

(i) iteratively applying all positive transformations $y = ax + b$;

(ii) ranking the results with a predetermined performance goal according to a hierarchy such that class 1 type results where type I errors are below a type II threshold frequency and type II errors are below a type II threshold frequency are preferable to class 2 type results where although type I errors are below the type I threshold frequency, type II errors are above the type II threshold frequency;

class 2 results are preferable to class 3 type results where type I errors are above a threshold frequency, and type II errors are above a minimal tolerance, which are above class 4 type results wherein type I are above type I threshold frequencies and type II errors are below the minimum threshold.

(iii) applying the best K1 results to the each of the best K1 results obtained for previously considered feature;

(iv) truncating the result set by discarding all but best K2 results for iterative results of all features previously examined.

Preferably, within each class, different transformations are compared by score, such that maximum score is preferred, the score being calculated in accordance with at least one of the following rules:

(i) in class 1, the score is $(\text{sensitivity})^p (\text{False Positive rate})^{-1}$;

(ii) within class 2, the score is the opposite of the False Positive rate;

(iii) within class 3, the score is the sensitivity value;

(iv) within class 4, the score is again set to the sensitivity value;

(v) where two transformations within the same class have identical scores, the transformation closest to $a=1$, $b=0$ is preferred.

Optionally, each significant feature $v_n$ of each irregularity may be quantitatively classified with a numerical value corresponding to a continuous range between definite True T and definite False Positive FP, the method comprising the steps of: setting a performance function $\phi$ for differentiating between distributions of T and FP;

Considering each feature $v_n$ in turn;

(i) optimizing ordinates $a_n$ and $b_n$ for feature $v_n$ using the performance function such that distribution of results in sample sets $T_n$ and $FP_n$ are distinguishable;

(ii) using thus optimized values of $a_n$ and $b_n$ for all considered and optimized variables $v_{n-1}$, $v_n$ as starting points to optimize subsequently feature $v_{n+1}$, by the performance function $\phi$;

(iii) repeating steps (i) and (ii) for all features $v_n$ (iv) if values a and b for all variables $v_n$ taken together give sufficient confidence in differentiating between true and false positives for diagnostic purposes, then using $a_n$ and $b_n$ for all features $v_n$; else reiterating through steps (i) to (iii) as necessary, using optimized values for all features for further optimization until sufficient confidence is attained.

Typically, for the performance function $\phi$, the ordinates $a_n$ and $b_n$ for each feature $v_n$ are optimized by numerical differentiation.

In a specific embodiment, for the performance function $\phi$, the ordinates $a_n$ and $b_n$ for each feature $v_n$ are optimized by differentiating with respect to a and b in turn, and setting differential to 0, to identify local maxima.

More specifically, values of $a_i$, and $b_i$ of linear transformation for feature $v_i$ are calculated by determining the highest gradient of performance function $\phi$ in (a,b) space for feature $v_i$ by partial differentiation of the performance function $\phi$, with $d\phi/da$ and $d\phi/db$ considered separately.

Typically, the performance function $\phi$ comprises a relationship between a locator function and a spread function for both the T and the FP distributions.

In one specific algorithm the performance function $\phi$ comprises the difference in mean values of the T and FP distributions divided by the sum of standard deviations.

In another specific algorithm, the performance function comprises the difference in median values of the T and FP distributions divided by the sum of standard deviations.

The term system relates to the equipment used for generating an image of a subject. Specifically, to X-ray equipment, including radiation sources, detectors and imaging equipment.

A detection algorithm is a set of coded instructions used for detecting features in an image.

Type I errors are missed results, also known as false negatives.

Type II errors are also known as false positives. These are artifacts of the testing technique, typically representing the results of statistical tests that do not relate to the phenomenon being tested for.

The term irregularity, as used herein, refers to a noticeable abnormality in an X-ray image.

The term candidate as used herein refers to an irregularity that is suspected as indicative a malignant lesion.

BRIEF DESCRIPTION OF THE FIGURES

For a better understanding of the invention and to show how it may be carried into effect, reference will now be made, purely by way of example, to the accompanying Figures, wherewith it is stressed that the particulars shown are by way of example and for purposes of illustrative discussion of the preferred embodiments of the present invention only, and are presented in the cause of providing what is believed to be the most useful and readily understood description of the principles and conceptual aspects of the invention.

DESCRIPTION OF PREFERRED EMBODIMENTS

Figure 1:
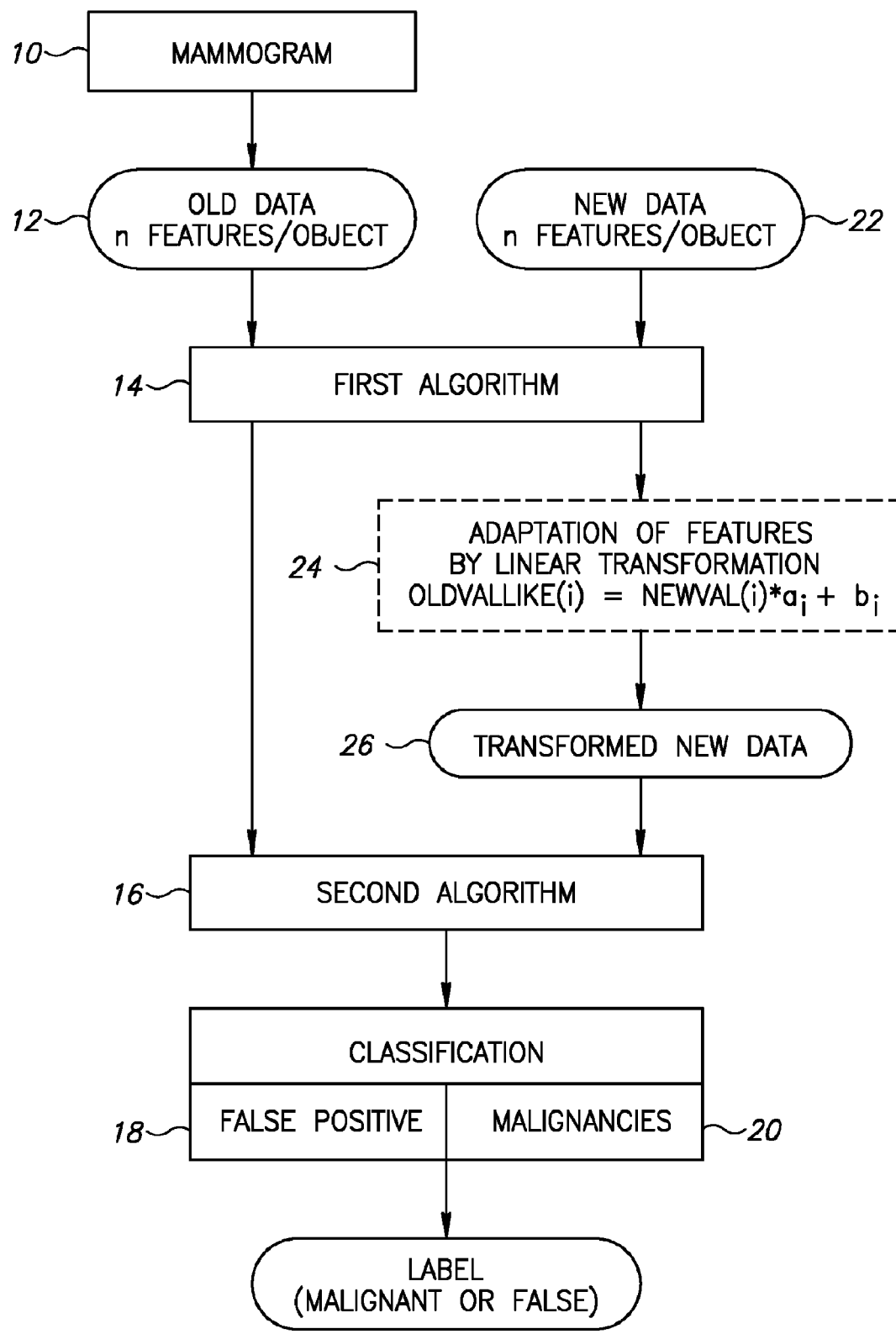
FIG. 1 is a schematic flowchart showing how data generated by one system can be analyzed by a classifier trained on data generated with a different system.

The present invention relates to methods for adapting detection algorithms developed for usage with data generated by one system to data generated with a second system.

To explain the approach, the following discussion focuses on mammography and addresses the issue of adapting a classifier trained to identify candidate irregularities as being lesions or false alarms.

It will be appreciated that such algorithms are designed to be fail safe. They have to catch all irregularities that could be malignant. Afterwards, as many false positives should be identified and discarded. Thus such algorithms have two stages: A first procedure of detecting irregularities with minimal type I errors followed by a second procedure of filtering out type II errors (false positives). The two procedures make decisions based on detected features that characterize the irregularities detected, such as size, shape, contrast with surrounding, regularity of shape, etc. The technique is essentially a statistical one applied to irregularities in a two dimensional image having 'depth', i.e. contrast levels per pixel. The parameters of the irregularities shown in the image can generally be linked to physiological features of breast tissues and typical malignant or benign lesions and tumors in the breast.

The CAD process starts with generating 'candidates'. A candidate is an irregularity that is suspected as being a malignant lesion. The sensitivity of the candidate generation process must be at least equal to the sensitivity expected from the overall CAD process since missing a malignant lesion could be fatal. The number of False Positives (FP rate) produced at this initial candidate generation step is usually higher than the FP rate expected from the overall CAD process since some the FPs can be eliminated at later stages.

The software module allowing for eliminating excess FPs (and as few as possible true malignancies) is referred to hereafter as a 'classifier' since it classifies all previously generated candidates as probable malignancies and as probable benign irregularities.

The classifier essentially implements some mathematical-statistical method that combines a generally large number of parameter values describing every candidate. These values are computed in a step called 'features extraction' where, for each candidate, a value is calculated for every defined feature.

Where detection algorithms developed for one mammography equipment, perhaps producing digital mammograms with one type of radiation is adapted for a different system, say a FFDM system, the results obtained are generally poor.

Generally, the performance of the candidate generation step on mammograms from a different system is comparable to that obtained on a training set, provided an elementary brightness/contrast adaptation of the images is first performed. The classifier, on the other hand, typically fails to provide the same level of performance for the new type of mammograms due to significant differences in the magnitudes of some or all of the features characterizing each irregularity that are used in the decision making process.

If enough mammograms are available for the different system to create a new training set, the system can be trained. In many cases only a very limited number of mammograms are available for the new data type, making it impossible to create a robust classifier.

It has been surprisingly found that good results may be obtained by linearly transposing the values of each selected feature generated by the first procedure, prior to applying the second procedure to those values.

By the central limit theorem, the mean average of any sample approximates the average of the system, and the larger the sample, the better the approximation.

The best samples are the full set of identified malignancies and the full set false positives. By hypothesizing that there is a linear relationship between the results generated using new data from the new system and the results generated using old data from the old system, it is possible to map one set of results onto the other using a linear translation of the type:

$$V_{old} = aV_{new} + b$$

Using the average magnitude for all detected malignancies and the average magnitude for all false positives, two equations are generated with two unknowns, the multiplier a and a constant b.

To illustrate the principle, the following discussion focuses on the specific application of mammography, it being understood that the techniques have wider application.

With reference to FIG. 1, the principle may be summarized as follows: For a subject mammogram 10 obtained with a first set of equipment, an old data set $D_{old}$ 12 is generated using a first algorithm $f_1$ ($D_{old}$) 14.

Data set 12 is designed to minimize false negatives FN, so $f_1\{FN\} \to \{0\}$, and typically contains data relating to malignancies, i.e. true results T and false positives FP.

$$D_{old} = \{T, FP\}$$

For each result, i.e. each feature of each irregularity in the data set, a second algorithm $f_2$ 16 is applied to $D_{old}$ to classify the results as either malignancies T 18 or as False Positives FP 20.

Adapting the technique to new data $D_{new}$ 22 with the linear relationship hypothesis, requires addition of a linear transformation $f_3$ 24 to produce linear transformed new data 26 such that $D_{old}$ has a linear relationship with the new data, i.e $D_{old} = aD_{new} + b$ Having applied the linear relationship, second algorithm $f_2$ 16 is applied to $D_{\beta new}$ to classify the results as either malignancies T 18 or as False Positives FP 20.

The challenge in applying this technique is that the multiplier m and the shift value C are generally unknown.

Large Data Sets—the Statistical Approach

Figure 2:
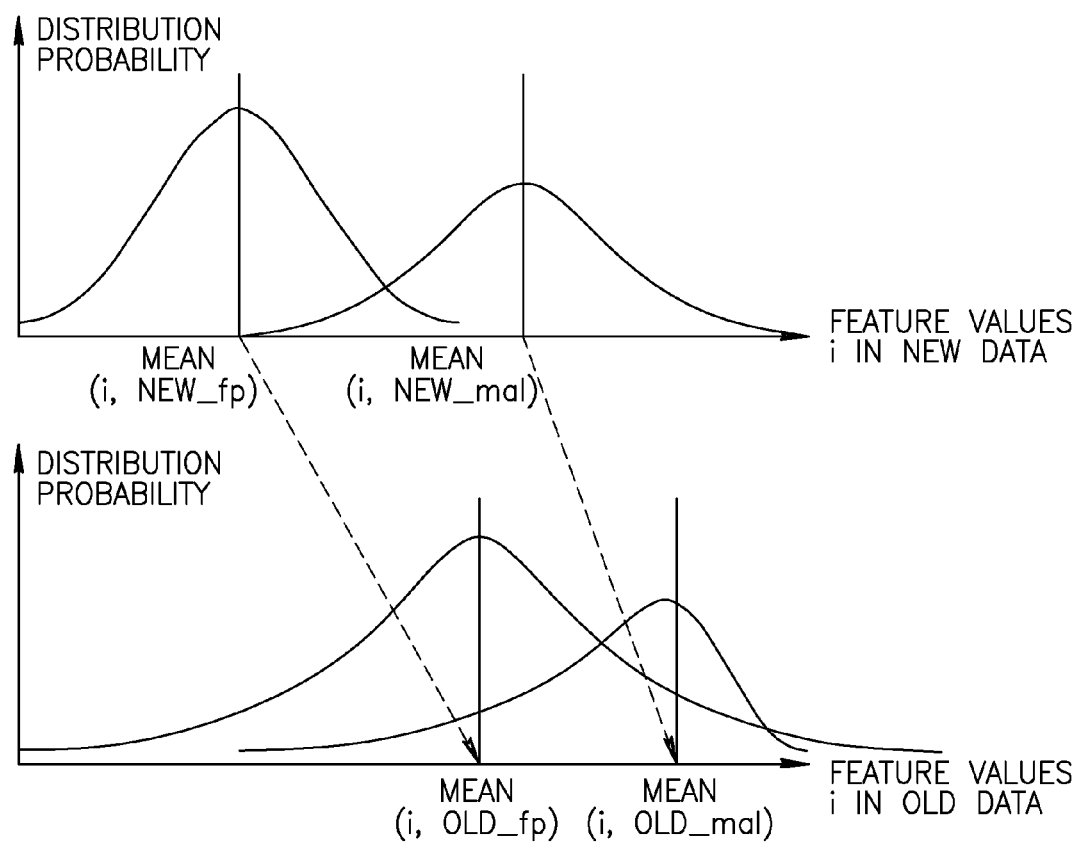
FIG. 2 illustrates how distributions of the values for a selected feature characterizing data generated by one system "new data" can be mapped onto data generated by a second system "old data"

With reference to FIG. 2, distribution probabilities for malignancies and false positives are shown for new data generated with the new system using algorithms developed for the old system.

The mean false positive value for the new data has a linear relationship with the old data:

$$\text{ave}(FP_{new}) = a(\text{ave}(FP_{old})) + b \quad [1]$$

Similarly, the mean malignancy value for the new data has a linear relationship with the old data:

$$\text{ave}(T_{new}) = a(\text{ave}(T_{old})) + b \quad [2]$$

The two equations can be solved simultaneously to determine the multiplier a and the shift b.

By pooling all available data for all the malignancies and false positives for all available images, the best estimates for the coefficients a and b will be generated. It will be appreciated that the above statistical approach gives good results where large sample sets of both malignancies and false positives are available in corollary of the central limit theorem.

The assumption that classifier algorithms for sorting irregularities in the images obtained into true results and false positives, that are developed for one imaging system can be used for other systems if a linear transformation is applied is a reasonable one. Typically, not enough data is available to apply the approach explained above with reference to FIG. 2. Considering mammography applications, there are often simply not enough mammographs showing malignancies and false positives, to generate statistically meaningful results. The mean result from the sample does not adequately reflect the population as a whole, and the simultaneous equations do not give accurate enough values for the multiplier a and shift b.

Now the different CAD systems available can usefully be classified as either qualitative systems that identify suspect irregularities as either malignancies or as false positives in a YES/NO manner, or as quantitative systems which ascribe a numerical value to each suspected irregularity, perhaps normalized into a probability 0<P<1, with a probability of zero being definitely a false positive FP, and a probability of 1 indicating a certain malignancy.

In each case, the characterization is based on a number of features, say p, q, r, s, t .... For qualitative identification, a function of these features (variables) enables a YES/NO decision to be made. For quantitative systems, ultimately, the function of the features gives a value between 0 and 1.

A variant method of that described hereinabove with reference to FIG. 2, that is appropriate for generating values of a and b for each feature p, q, r, s, t ... for qualitative systems with relatively small sample sets is described hereinbelow, with reference to FIGS. 3 to 6. A second variant method appropriate for small sample sets where the results are quantified is then described with reference to FIG. 7.

Essentially all tumors or lesions having at least a minimum size should be identified. It is necessary to identify multipliers $a_f$ and shift constants $b_f$ for each feature f (p, q, r, s, t ... ) such that the sensitivity of the detection algorithm is maximized, i.e. the sensitivity of the identification or location stage of the CAD process must be fail safe, not missing any malignancies—type I errors, that being prioritized, it is then necessary to minimize type II errors, i.e. the number of false positives FP.

Qualitative Method for Small Data Sets—the Iterative Approach

The qualitative approach calls for systematically testing all possible values for a and b for each feature in an iterative manner. In this manner, appropriate coefficients for linear shifting each feature are obtained.

Figure 3:
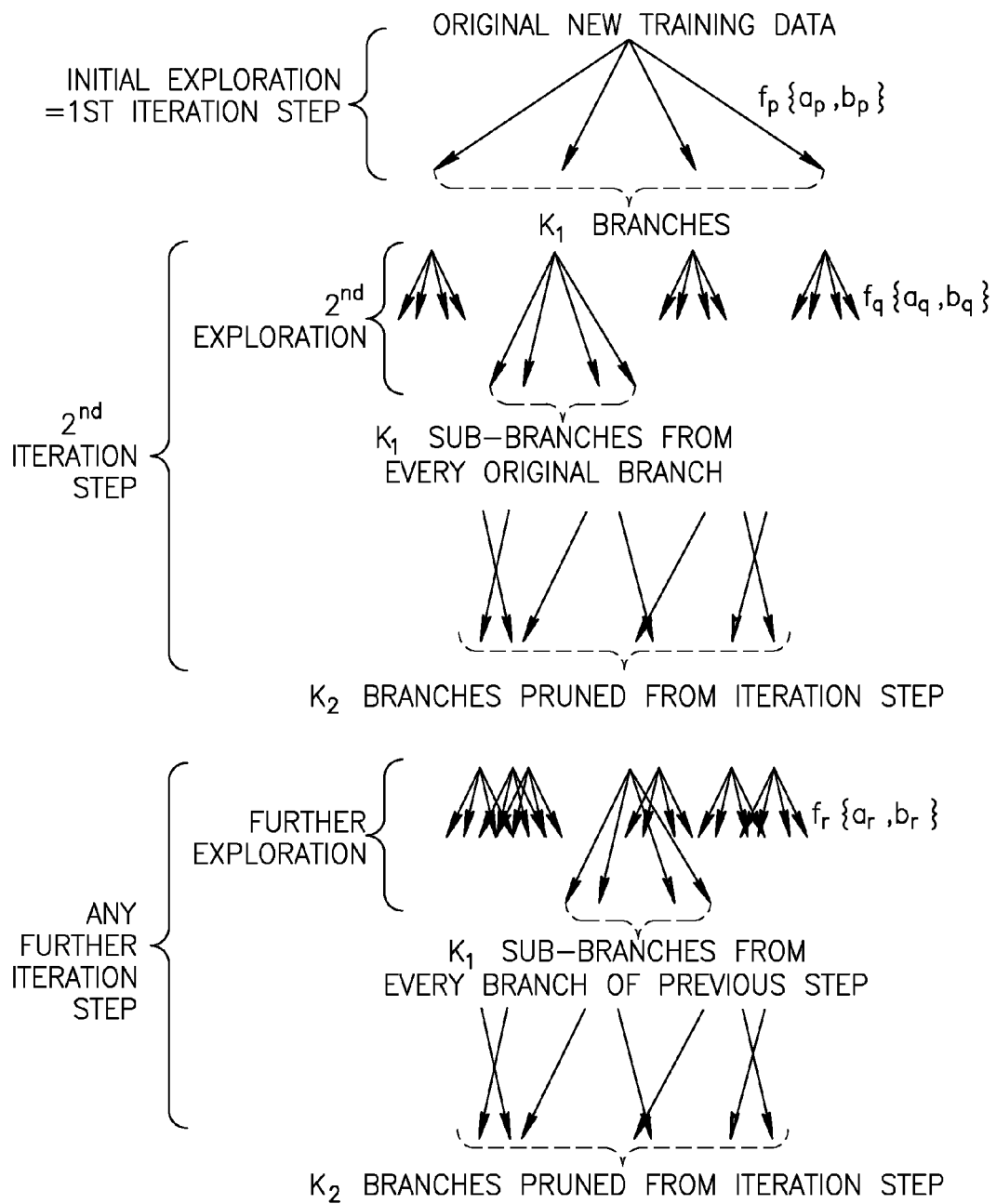
FIG. 3 shows the iterative process by which a qualitative classifier developed for classifying the results from one system may be adapted to classify the results for a second system.
Figure 4:
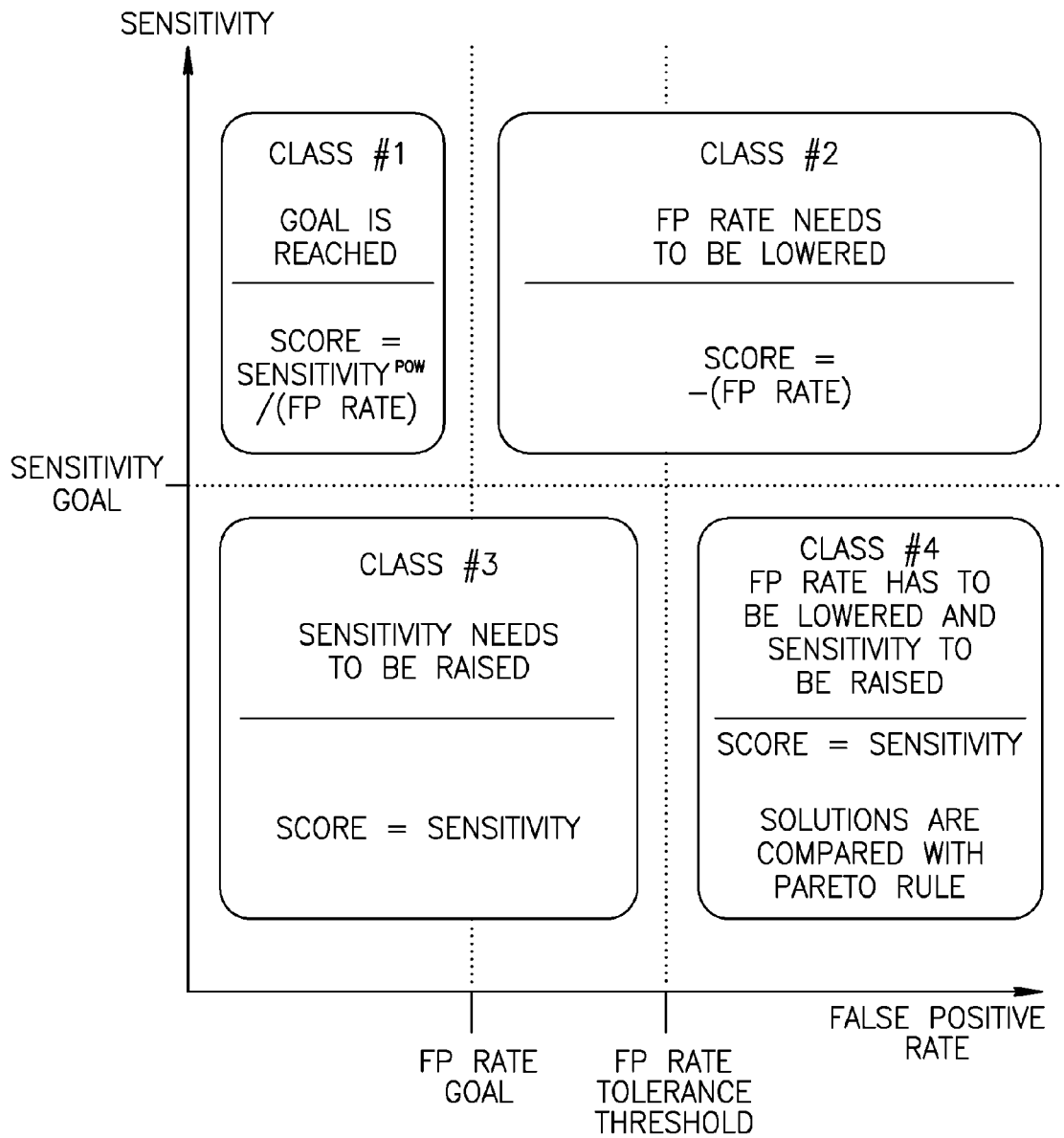
FIG. 4 shows a schematic presentation of comparing different solutions using such a qualitative classifier.

With reference to FIG. 3, each arrow represents a solution set for a and b for a feature for the pool of training data available. In a first iterative step each possible value of $a_p$ and $b_p$ are tested for the first feature $f_p$. In the second iterative step each possible value of aq and $b_q$ are tested for the first feature q and so on. It will be appreciated that an infinite number of possible values for $a_f$ and $b_f$ may be proposed for each feature type monitored. However, only a very small number of such solutions give reasonable results.

The iterative type of approach is feasible for computer systems which are ideal for generating numeric solutions. Nevertheless, since high throughput is essential for screening applications, (whether mammography is considered, or the approach is applied to another application such as visual inspection of components in an array on a silicon wafer), it is not efficient to try all possibly solutions for each feature, and thus for each feature taken in turn, the results are truncated by only the best K solution sets being considered further. $K_1$ branches are selected in the first iteration. In the illustration, $K_1$ is 4. This is by way of example only, it being appreciated that computers can handle larger numbers with ease.

Having done this, the number of false positives should be minimized. FIG. 3 is a schematic presentation showing the comparing of different solutions using such a qualitative classifier. Thus with reference to FIG. 3, for each data feature, a sensitivity is determined that maximizes the number of lesions determined.

For the best $K_1$ solutions for feature p, possible values of $a_q$ and $b_q$ are tested systematically. The best $K_1$ solutions for $a_q$ and $b_q$ for each of the best $K_1$ solutions for $a_p$ and $b_p$ are then generated. The result set would thus increase geometrically, giving $K_1{}^n$ for n features. Generally however, the number of combinations considered can be truncated to a number $K_2$ (in illustration the number 7 is shown).

In the third iterative step, solutions for $a_r$ and $b_r$ are then tested systematically and the best $K_1$ solutions are chosen.

Strictly speaking, not only can $K_1$ and $K_2$ take any value with the larger sample sizes chosen providing a greater certainty that the optimal solutions for combinations of $a_p$, $b_p$, $a_q$, $b_q$ are considered, but the K values need not be the same for each exploration step where values of $a_f$ and $b_f$ are hypothesized for each feature. Similarly, $K_2$ values used for pruning unlikely branches need not be the same for each further iteration.

Generally, the basic algorithms that were designed and used have been validated empirically and there may also be a theoretical basis behind the selection of the features to be analyzed, which maps them to real world effects. Thus the relative importance to be assigned to each feature is often at least partially understood.

When selecting appropriate coefficients for the linear transformation, performance goals are determined for sensitivity which should be maximized, and for the frequency of False Positives, which should be minimized. This is illustrated graphically in FIG. 4, where sensitivity is plotted against False Positive rate and four solution types are shown: Classes 1 to 4. In general, when comparing different possible linear translations, one solution is preferred to another if it produces modified data that is closer to the performance goal selected.

In class 1 type solutions to the equations for $M_f$ and $C_f$, high sensitivity and low false positive rates are obtained. These solutions are ideal. In Class 2 type solutions the sensitivity is acceptable, but the number of false positives generated is too high. Class 3 type solutions are not sensitive enough, in that too many malignancies are missed in mammography and other cancer screening applications, whereas Class 4 type solutions are hopeless, in that neither the sensitivity is high enough, and the number of false positives is not only above an acceptable threshold, but is even too high for optimization to be a meaningful exercise. Thus the hierarchy of classes is class 1>class 2>class 3>class 4. Within each class, a different scoring system is used to compare different solutions. In class 1, the score is defined as $(\text{sensitivity})^p (\text{False Positive rate})^{-1}$; the power p reflecting the relative importance of maximizing sensitivity (generally critical) and minimizing false positives (desirable). For comparing different transformations within class 2, since the sensitivity of detection is acceptable but the number of False Positives is too high, the score is simply the opposite of the False Positive rate, so that the lower the number of false positives, the better. For comparing different transformations within class 3, since the sensitivity of detection is inadequate, the score is set to the sensitivity value, i.e. the number of False Positives generated by the competing transformations is ignored. In class 4, since neither the sensitivity of the detection of the accuracy of the diagnosis are acceptable, as in class 3, the score is again set to the sensitivity value, but the score is only used for pruning purposes.

It sometimes happens that two transformations give identical scores. In such cases, the transformation closest to a=1, b=0 is selected, which implies that where all else is equal, it is preferable to use the algorithms developed for the original system with minimal transforming, (Ockham's razor).

Figure 5:
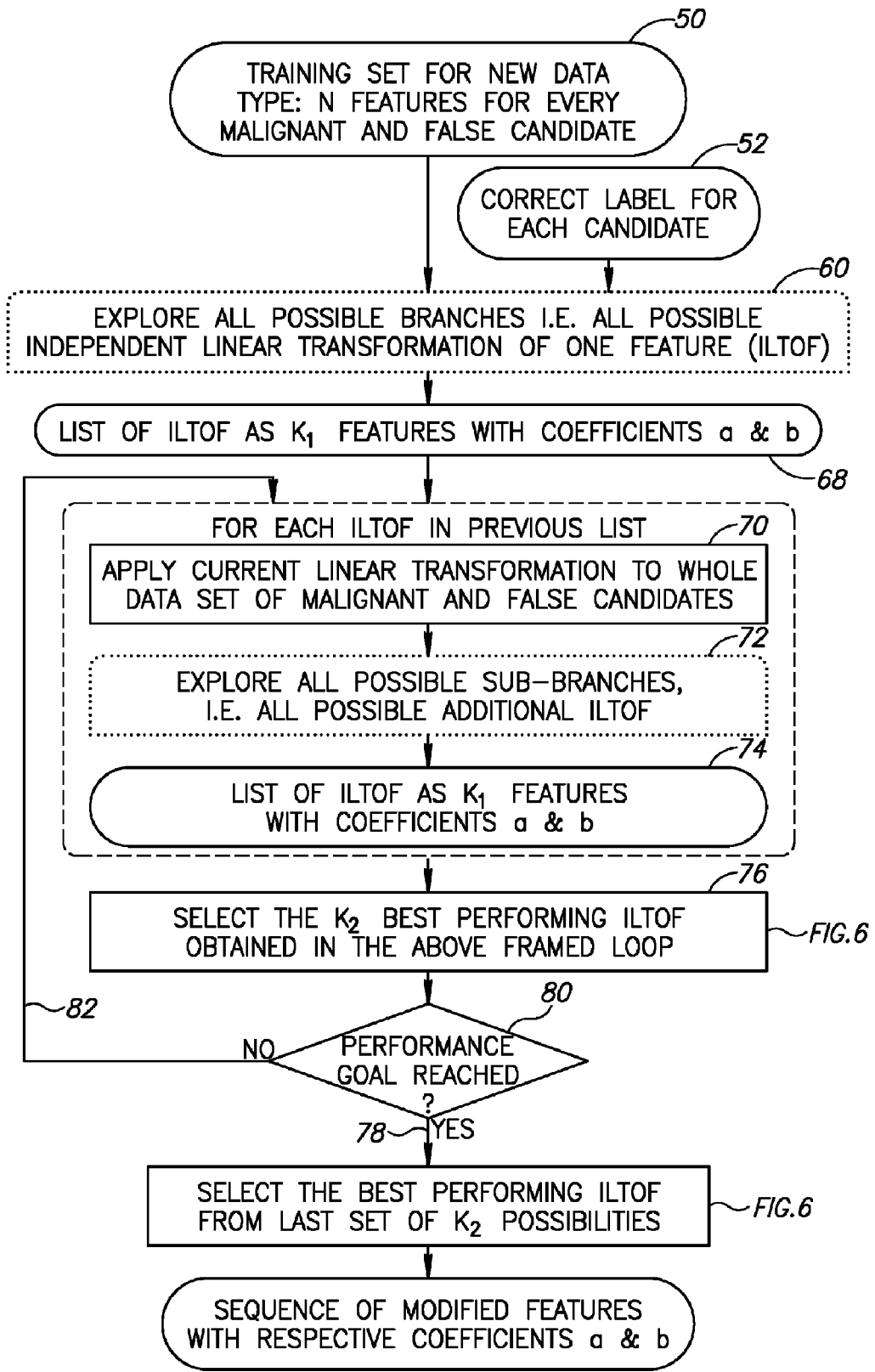
FIG. 5 shows a flowchart indicating the adaptation of a qualitative classifier to a new data type.
Figure 6:
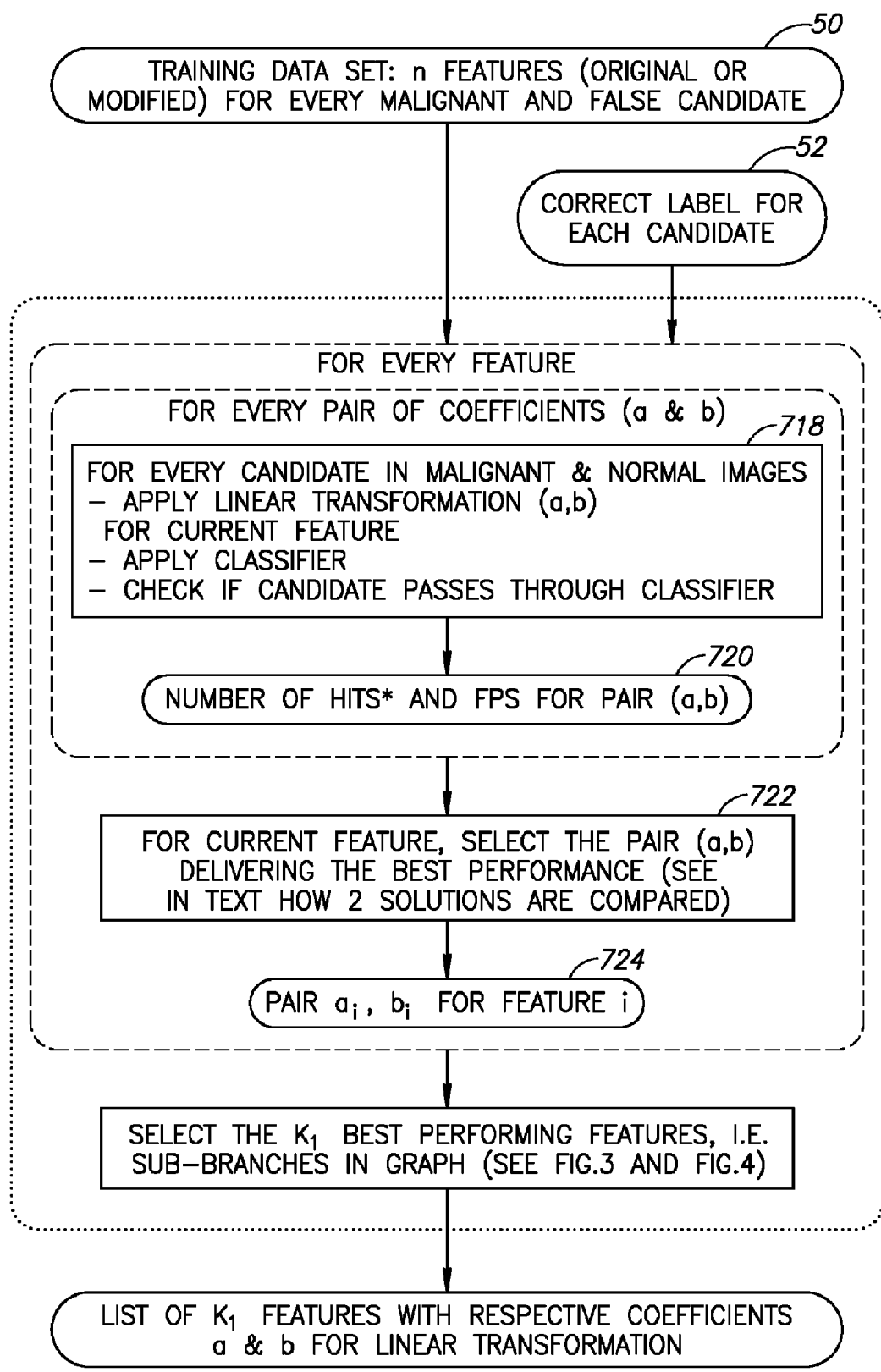
FIG. 6 shows a flowchart for exploring all possible sub-branches from a given set of features as presented in the flowchart of FIG. 5.

Having explained the basic approach, a specific algorithm is described in FIGS. 5 and 6 that generated solutions for $a_f$ and $b_f$ for all features.

In qualitative systems, the function relating the monitored features p, q, r, s, t . . . has to give a value that is sensitive enough to detect as many malignancies as possible.

With reference to FIG. 5, a flowchart summarizing a specific iterative methodology for adapting a qualitative classifier developed for one data type to a new data type having N features is shown. The available training set 50 of correctly labeled malignancies and false positives with N features identified for each candidate irregularity together with correct labels for each candidate 52 for is fed into a testing procedure 60 shown in more detail in FIG. 6 and described hereinbelow.

The testing procedure 60 compares the results obtained by applying all possible linear transformations, i.e. all possible values of a, and b, to the data set 50 and comparing the results with the correctly labeled results 52 for the first feature f1. The best K1 values are retained 68 and other, less favorable transformations are discarded.

For each of the best K1 transformations for the first feature f1, the transformation is applied to the first feature f1 for all the data points 70. Then for second feature f2, all possible linear transformations, i.e. all possible values of $a_2$ and $b_2$, are applied 72. Once again, the best K1 transformations are retained 74 and less promising transformations are rejected.

The best K2 results for f1 and f2 are retained 76, with the remaining transformation sets, i.e. $K1^2$-K2 sets, being rejected.

If an acceptable performance is obtained 78, and applying the transformation to the data set 50 gives correctly labeled results 52, attaining the desired performance goals 78, then the best result 80 is selected. If not 80, then further iterations are ran 82. In this manner, appropriate values for af and bf are obtained for each modified feature and the coefficients can be used to modify the detection algorithm obtained for the old data set, for usage with the name data set, obtained with the modified equipment.

With reference to FIG. 6, the testing procedure 72 is explained in more detail. Essentially, the candidate coefficients a and b for each possible transform for each feature f are applied to each data point in turn 718, and the transformed data is ran through the classifier 18 (FIG. 1). The number of malignancies and false positives successfully diagnosed are logged 720, and the transformations for each feature f, giving the best results are identified 722, and thus the optimal coefficients a and b are obtained for each feature 724. When considering the features individually, a number of transformations will give reasonable results. But, when considering all the data together, it is possible to compare the different solutions and to ascertain the best solutions. The method of comparison may be explained by referring back to FIG. 4. Essentially, class 1 results, where the sensitivity is adequate and the false positive rate is low, are the best. Class 2 results where sensitivity is maintained but too many false positives are generated are less desirable. Class 3, where the sensitivity is lower and some malignancies are not detected at all are less desirable still, whereas class 4, wherein the false positive rate is high and the sensitivity is low, are of almost no value at all.

Quantitative Method for Small Data Sets—Using Differential Calculus

In quantitative systems, the individual data points are not merely characterized as true results or false positives, but a performance function is defined, and for each point, a numerical score is calculated. The scale and units may vary. The decision as to whether an individual irregularity is considered a true result or a false positive is based on the total score for all features taken together in accordance with some formula or model. Since the results are numerical, the effects of varying the coefficients for each feature can be observed.

Figure 7:
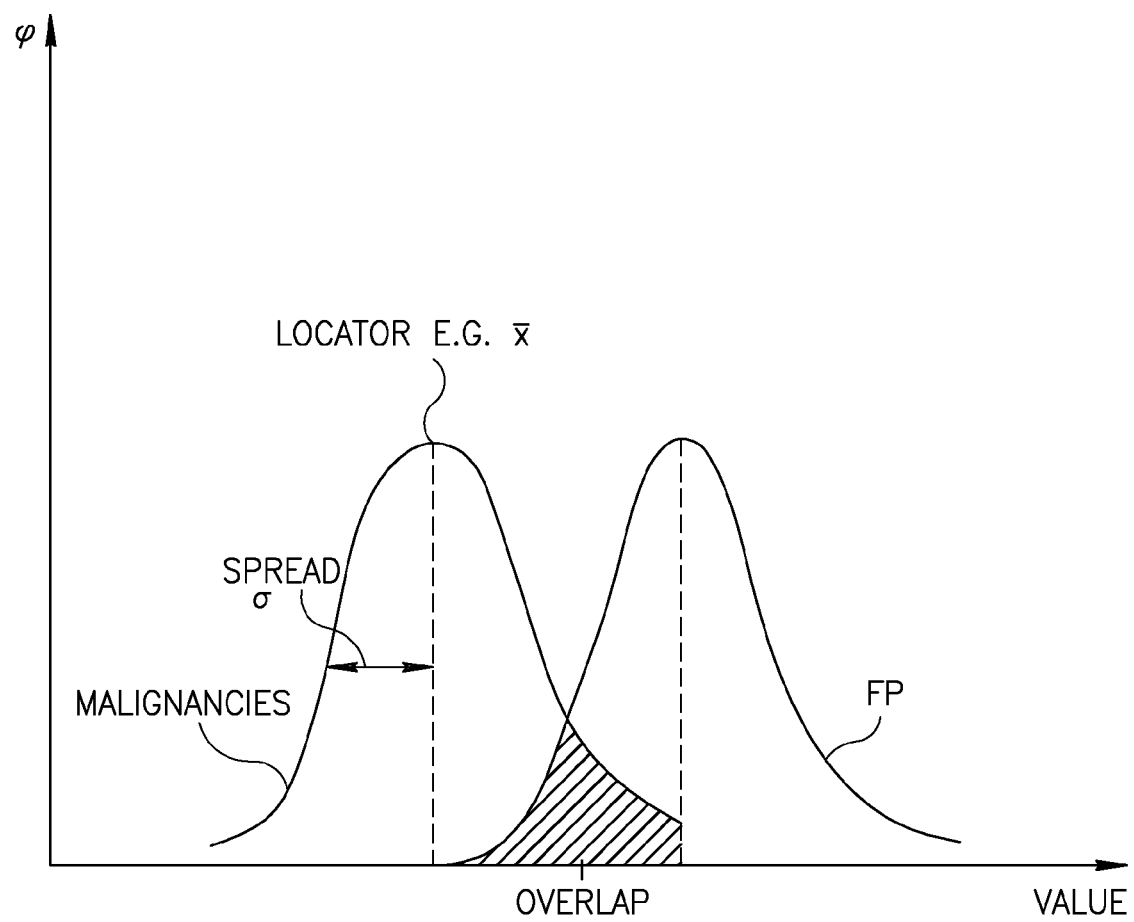
FIG. 7 is a schematic representation of the bimodal distribution representing malignancies and false positives, such that transformations are selected to minimize the overlap and maximize the leptokurtoses thereof

With reference to FIG. 7, the histograms of linear shifts for large samples tend to provide bell shaped distributions, with locators (typically some average, such as the mean or median), and a spread parameter, typically the variance or standard deviation being used.

Now, the data set relates to two populations: Malignancies and False Positives, both typically having bell shaped distributions. The appropriate transformation is one that minimizes the overlap between the two data sets. Consequently, the coefficients a and b for best transformations of new data to old data should produce leptokurtic distributions with low spread, and minimal overlap between the two distributions.

In one quantitative approach, the two coefficients a and b, for each feature v are linked by a performance function $\phi$ relating to both location and spread of the distributions. The relative utilities of different values of coefficients a and b can be directly since the optimum values for a and b are those that maximize the performance function $\phi$.

Essentially, each significant feature $v_n$ of each irregularity may be quantitatively classified with a numerical value corresponding to a continuous range between definite True T and definite False Positive FP, the method comprises the steps of: setting a performance function $\phi$ for differentiating between distributions of T and FP;
Considering each feature $v_n$ in turn;
(i) ordinates $a_n$ and $b_n$ are optimized for feature $v_n$ using the performance function $\phi$ such that distribution of results in sample sets $T_n$ and $FP_n$ are distinguishable;
(ii) using thus optimized values of $a_n$ and $b_n$ for all considered and optimized variables $v_{n-1}$, $v_n$ as starting points, a subsequent feature $v_{n+1}$ is optimized by the performance function $\phi$.
(iii) steps (i) and (ii) are thus repeated for all features $v_n$
(iv) if values a and b for all variables $v_n$ taken together give sufficient confidence in differentiating between true and false positives for the specific diagnostic purpose, for example, in mammography, identifying all possible malignancies but having an acceptably low level of false positives, then, $a_n$ and $b_n$ for all features $v_n$ may be used to define the transformation for adapting the original algorithms developed for use with the original equipment, fur usage with the new system. If the results are not good enough however, one or more further iterations may be done, repeating steps (i) to (iii) for each feature in turn, as necessary, using optimized values for all features for further optimization until sufficient confidence is attained.

Since the performance function $\phi$ is a numerical relationship, i.e. the system in quantifiable, the ordinates $a_n$ and $b_n$ for each feature $v_n$ may be optimized by numerical differentiation.

In a specific embodiment, for the performance function $\phi$, the ordinates $a_n$ and $b_n$ for each feature $v_n$ are optimized by differentiating with respect to a and b in turn 910, and setting differential to 0, to identify local maxima. For example, values of $a_i$ and $b_i$ of linear transformation for feature $v_i$ are calculated by determining the highest gradient of performance function $\phi$ in (a,b) space for feature $v_i$ by partial differentiation of the performance function $\phi$, with $d\phi/da$ and $d\phi/db$ considered separately.

Different performance functions $\phi$ are possible, but typically, the performance function provides a relationship between a locator function and a spread function for both the T and the FP distributions.

In one specific algorithm, the performance function $\phi$ comprises the difference in mean values of the T and FP distributions divided by the sum of standard deviations.

In another specific algorithm, the performance function comprises the difference in median values of the T and FP distributions divided by the sum of standard deviations.

Other ranking systems are possible.

Figure 8:
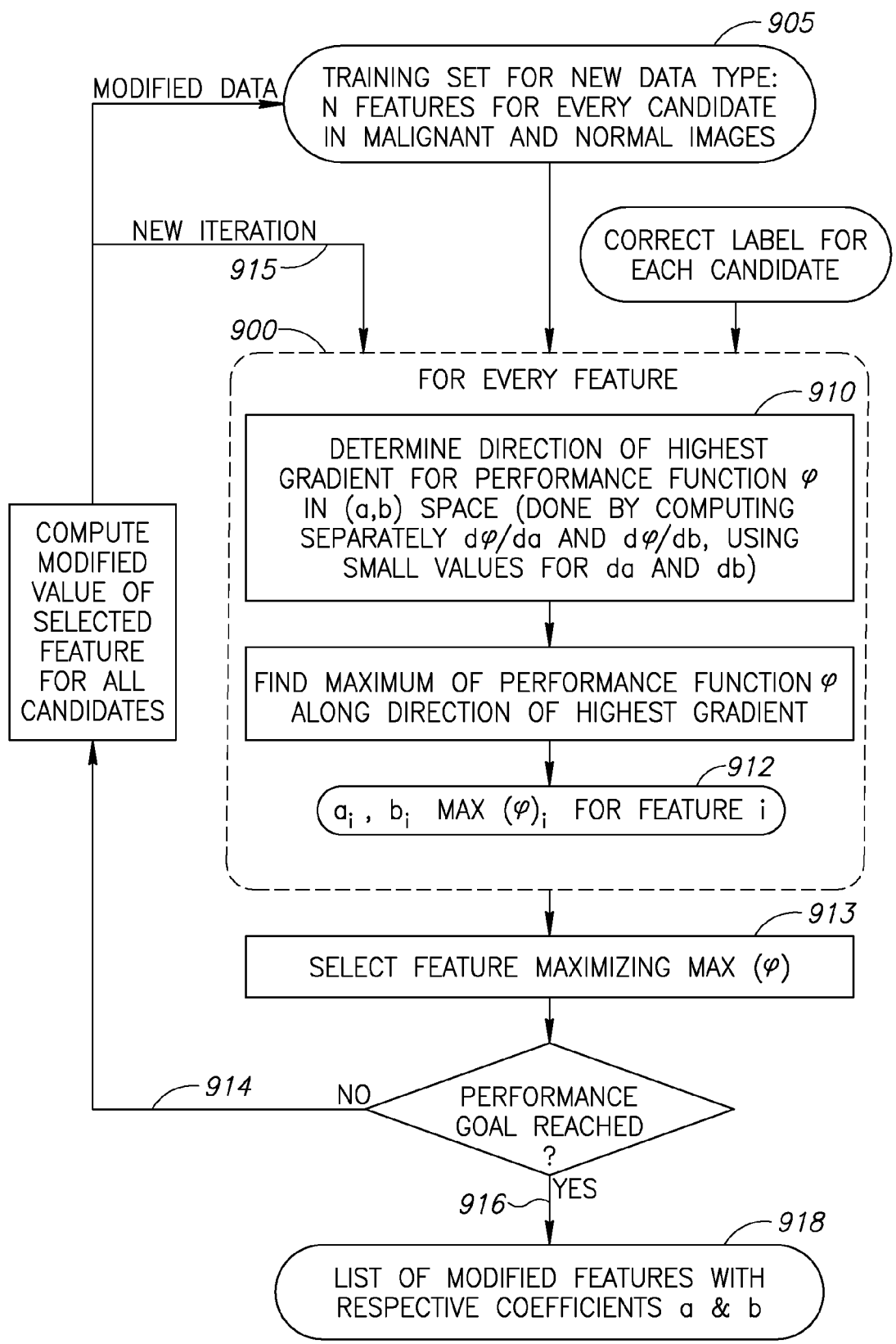
FIG. 8 shows a flowchart indicating the adaptation of a quantitative classifier to a new data type according to another embodiment of the present invention.

Referring to FIG. 8, essentially therefore, for each feature 900 in turn, values are tweaked such that the derivative of the function is 0, indicating a maximum 912. This signifies the coefficients a and b having a large influence on the performance function.

Once one feature is determined, it is held constant 913 and the next feature is tweaked, the values of a and b being set to make differentiating between malignancies and false positives as clear as possible, essentially fiddling the location and spread of the two histograms such that a balance is created between their shape and the overlap.

Essentially, an embodiment of this approach can be considered as differentiating the performance function with respect to a and b separately 910 and finding the direction of the highest gradient in a, b space 912.

Once all features are tweaked in turn, if the overall sensitivity is still inadequate 914, further iteration(s) are run 915, tweaking the features again, as necessary.

Once the performance function reaches a predetermined value, indicating an adequate difference between the true and the false positive data sets, the iterative process may be stopped 916. A list 918 may then be created giving coefficients a and b for each feature, tabulating the linear shift that can be used to modify the results to map the new data 905 onto the old data.

It will be appreciated that although computer aided detection CAD of malignancies in mammography is a specific application for such methods that is of major importance, the methods may be used for other types of medical imaging, such as lung X-ray analysis, but also for other types of computer diagnosis such as quality control in the semiconductor industry, or training radar, sonar, and other imaging systems used for identifying data of interest and discarding noise.

Indeed, the approach may be generalized beyond imaging, and could conceivably be used for adapting any classifier to data generated in a different manner from the reference data used to train the classifier. In addition to image analysis, possibly, the approach could be used to adapt algorithms for computer applications such as spam blocking for emails, stopping malware, retrieving data in a database and the like.

Thus the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:
1. A method for adapting a mammography detection algorithm developed for usage with mammography data gener- ated by a first system to mammography data generated with a second system, wherein the algorithm is for fail safe diagnosis of irregularities and comprises a first procedure of detecting irregularities with minimal type I errors and a second procedure of filtering out type II errors;

the data generated comprising values for selected features characterizing the irregularities;

the method comprising applying an intermediate step of linearly transposing the values of each selected feature generated by the first procedure, prior to applying the second procedure to those values;

wherein the irregularities are qualitatively classified as True T or False Positive FP, the linear transposing comprising:

for each feature in turn:
  (a) iteratively applying all positive transformations $y=ax+b$;
  (b) ranking the results with a predetermined performance goal according to a hierarchy such that class 1 where type I errors are below a type II threshold frequency and type II errors are below a type II threshold frequency are preferable to class 2 where although type I errors are below the type I threshold frequency, type II errors are above the type II threshold frequency;

and class 2 results are preferable to class 3 where type I errors are above a threshold frequency, and type II errors are above a minimal tolerance, which are above class 4 wherein type I are above type I threshold frequencies and type II errors are above the threshold;

(c) applying the best K1 results to the each of the best K1 results obtained for previously considered feature;
  truncating the result set by discarding all but best K2 results for iterative results of all features previously examined.

2. The method of claim 1 wherein the intermediate step of linear transposing comprises determining a numerical multiplier $a_v$ and an offset $b_v$ for each significant feature v considered in diagnosis.

3. The method of claim 1 wherein within each class, different transformations are compared by score, such that maximum score is preferred, the score being calculated in accordance with at least one of the following rules:
  (i) in class 1, the score is $(\text{sensitivity})^p (\text{False Positive rate})^{-1}$;
  (ii) within class 2, the score is the opposite of the False Positive rate;
  (iii) within class 3, the score is the sensitivity value;
  (iv) within class 4, the score is again set to the sensitivity value;
  (v) where two transformations within the same class have identical scores, the transformation closest to $a=1, b=0$ is preferred.

* * * * *